United States Patent [19]
Jones

[11] Patent Number: 6,129,538
[45] Date of Patent: Oct. 10, 2000

[54] PRE-CUT ROLL AND THERMOFORMER MACHINE

[76] Inventor: W. Charles Jones, 3 Ida La., East Sandwich, Mass. 02537

[21] Appl. No.: 09/071,440

[22] Filed: May 1, 1998

Related U.S. Application Data

[60] Provisional application No. 60/045,243, May 1, 1997.

[51] Int. Cl.$^7$ .............................. B29C 51/02; B29C 51/42
[52] U.S. Cl. ........................ 425/302.1; 264/145; 264/160; 264/280; 264/322; 425/384; 425/397
[58] Field of Search .................................... 425/295, 296, 425/297, 397, 400, 387.1, 403.1, 302.1; 264/210.1, 280, 294, 297.4, 322, 297.5, 145, 160

[56] References Cited

U.S. PATENT DOCUMENTS

| | | |
|---|---|---|
| 1,797,568 | 3/1931 | Dean ........................................ 425/297 |
| 2,541,203 | 2/1951 | Canfield . |
| 3,107,394 | 10/1963 | Varon . |
| 3,161,915 | 12/1964 | Thiel . |
| 3,333,032 | 7/1967 | Dickinson . |
| 3,335,927 | 8/1967 | Zwiebel . |
| 3,454,693 | 7/1969 | Crenshaw . |
| 3,577,700 | 5/1971 | Bippus et al. ........................... 425/397 |
| 3,667,885 | 6/1972 | Shelby . |
| 3,733,160 | 5/1973 | Neil . |
| 3,830,611 | 8/1974 | Irwin . |
| 3,867,085 | 2/1975 | Lynch . |
| 3,867,088 | 2/1975 | Brown et al. . |
| 3,868,209 | 2/1975 | Howell . |
| 3,904,338 | 9/1975 | Straumanis . |
| 3,925,140 | 12/1975 | Brown . |
| 4,086,045 | 4/1978 | Thiel et al. . |
| 4,105,386 | 8/1978 | Thiel et al. . |
| 4,128,369 | 12/1978 | Kemerer et al. . |
| 4,267,140 | 5/1981 | Meeker . |
| 4,552,709 | 11/1985 | Koger, II et al. . |
| 4,555,377 | 11/1985 | Whiteside et al. . |
| 4,778,372 | 10/1988 | Mutti et al. ............................. 425/397 |
| 5,015,430 | 5/1991 | Suzuki et al. ........................... 425/297 |
| 5,167,781 | 12/1992 | Kemerer et al. . |
| 5,382,148 | 1/1995 | Buckley ................................. 425/297 |
| 5,620,715 | 4/1997 | Hart et al. . |

*Primary Examiner*—Patrick Ryan
*Assistant Examiner*—Joseph Leyson

[57] ABSTRACT

The present invention is a thermoformer which produces zero scrap during the heating, forming and cutting of a blister package. In one embodiment, the thermoformer comprises a pre-cut roll having a series of adjacent webs connected by a cut area. Each of the webs are defined by an overall length L, a width W, and a radius R. Each of the cut area are defined by a cut depth D1, said cut depth D1 being in the range of about 25% to 90% of the width W of the webs. The thermoformer further comprises a heating station adapted to heat each of the webs. The thermoformer further comprises a forming station adapted to form each of the webs. The thermoformer further comprises a cutting station adapted to separate the webs from each other by making a cut along each of the cut areas connecting the webs.

1 Claim, 4 Drawing Sheets

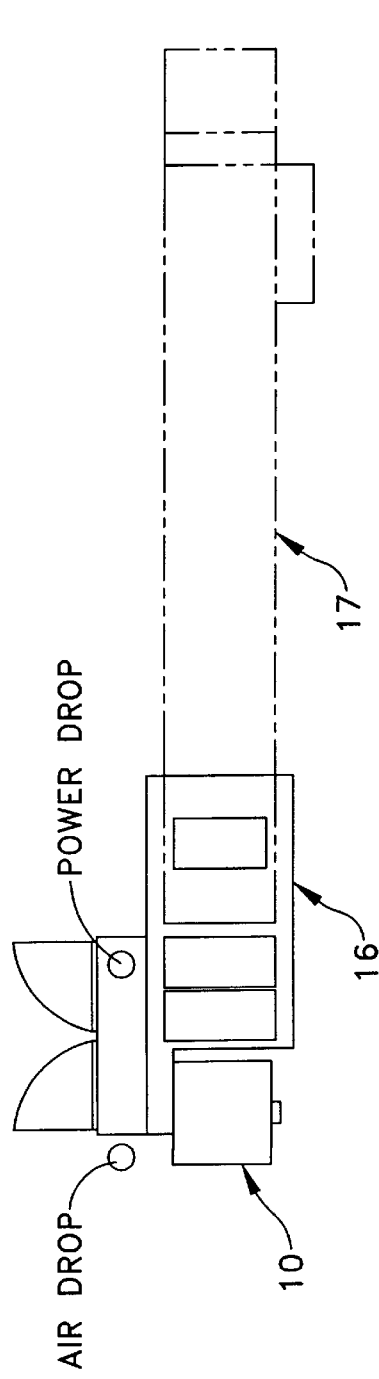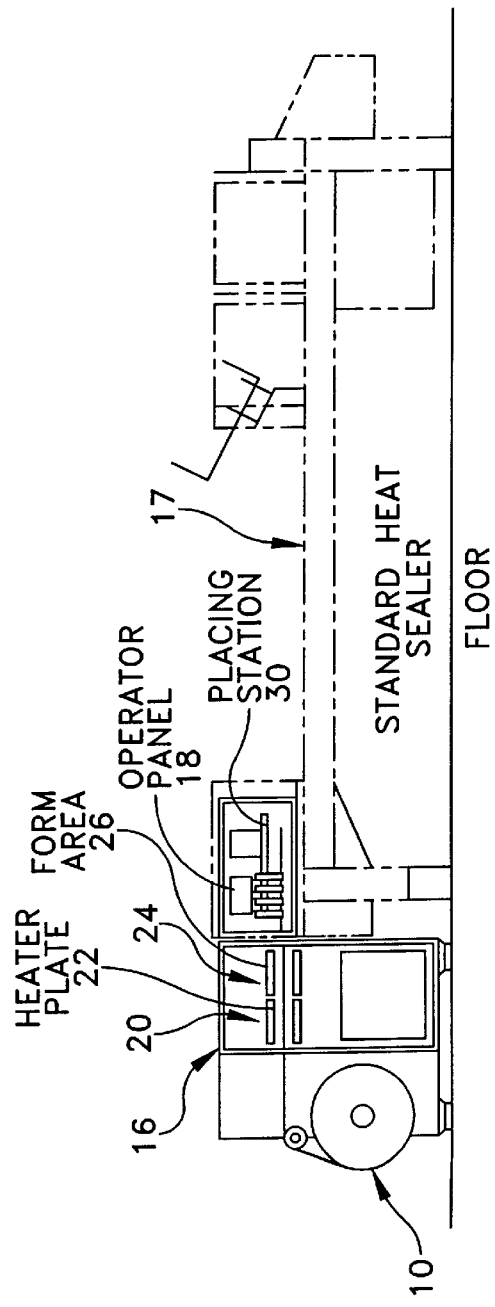

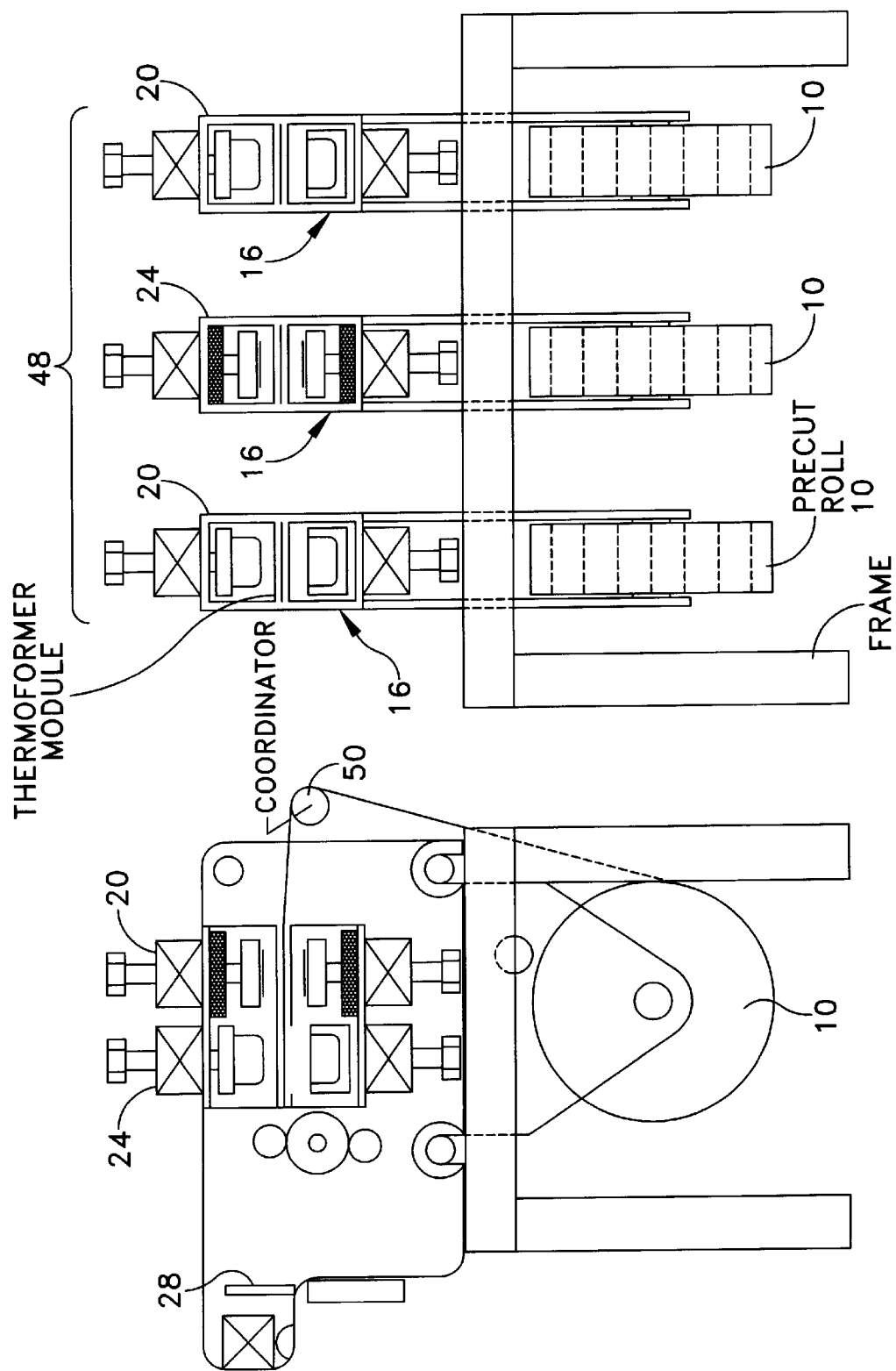

PRE-CUT ROLL AND THERMOFORMER MACHINE

This Application claims priority to Provisional Patent Application Ser. No. 60/045,243 filed on May 1, 1997.

FIELD OF THE INVENTION

The present invention relates generally to the field of thermoformer and heat sealer machines. More particularly, the present invention relates to the field of thin wall packaging used in connection with thermoformer machines.

BACKGROUND OF THE INVENTION

Thermoformer machines are typically used to form and cut a blister type package from a stock roll of material such as PVC, PET, and/or polystyrene. Thereafter, the formed package is delivered to a heat seal machine where an article is inserted within the formed package and the formed package is then sealed to a backing material. Such conventional thermoformer machines are not without drawbacks. First, use of a stock roll of material requires the thermoformer to include a trim press operation to cut the stock roll to the desired shape of the blister package. Use of a trim press operation produces a significant amount of scrap material to be discarded and increases the overall time it takes to produce a formed package. Second, conventional thermoformer machines typically stack the formed and cut blister packages for delivery to the heat sealing machine. The stacking of such blister packages requires that such blister packages be formed and cut by the thermofromer to have a non-zero draft side wall so that such blister packages can be removed from each other and fed to the heat sealer machine.

SUMMARY OF THE INVENTION

The present invention is a thermoformer which produces zero scrap during the heating, forming and cutting of a blister package. In one embodiment, the thermoformer comprises a pre-cut roll having a series of adjacent webs connected by a cut area. Each of the webs are defined by an overall length L, a width W, and a radius R. Each of the cut area are defined by a cut depth D, said cut depth D being in the range of about 25% to 90% of the width W of the webs. The thermoformer further comprises a heating station adapted to heat each of the webs. The thermoformer further comprises a forming station adapted to form each of the webs. The thermoformer further comprises a cutting station adapted to separate the webs from each other by making a cut along each of the cut areas connecting the webs.

BRIEF DESCRIPTION OF THE DRAWINGS

The following detail description of the invention will be better understood with reference to the accompanying drawings in which:

FIG. 3 is a top plan view of the first embodiment;

FIG. 4 is a side elevation view of the first embodiment;

FIG. 6 is a side cut-away view of a second embodiment of the thermoformer of the present invention; and FIG. 7 is an end cut-away view of the second embodiment.

DETAILED DESCRIPTION OF THE PREFERRED EMBODIMENTS

Figure 1:
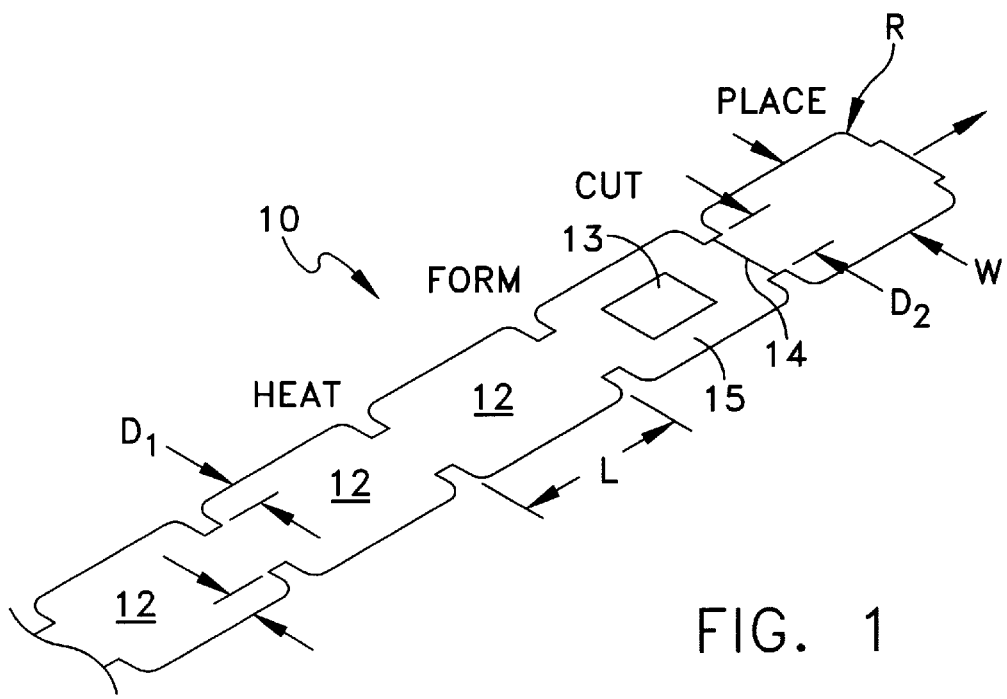
FIG. 1 is a perspective view of the pre-cut roll of the present invention.

Referring to FIG. 1 wherein the pre-cut roll 10 is shown comprising a series of webs or segments 12. Each of the webs 12 have an overall length L and a width W. The length L and width W may vary depending upon the desired size of the blister to be formed and would preferably be in the range of one (1) inch to eight (8) inches. Unlike conventional thermal plastic rolls, each of the webs 12 of the pre-cut roll 10 are pre-cut to a cut depth D1 and a radius R leaving only a cut area 14 having a width D2 connecting one web 12 to another. The amount of pre-cut for each of webs 12 may vary depending upon the desired size of the blister to be formed and type of thermo plastic material used. Preferably, each of the webs 12 would be pre-cut so that the depth D1 would be about 25% to 90% of the overall width W of the web 12 with the corners of each web 12 having a radius R in the range of about 0.125 inches to 0.500 inches. Although not shown, the thickness of pre-cut roll 10 may vary depending upon the desired size of the blister to be formed and type of thermo plastic material used. Preferably, the thickness of pre-cut roll 10 is in the rnage of 0.006 to 0.060 inches. Each web 12 further comprises a blister portion 13 and a flange portion 15.

Figure 2:
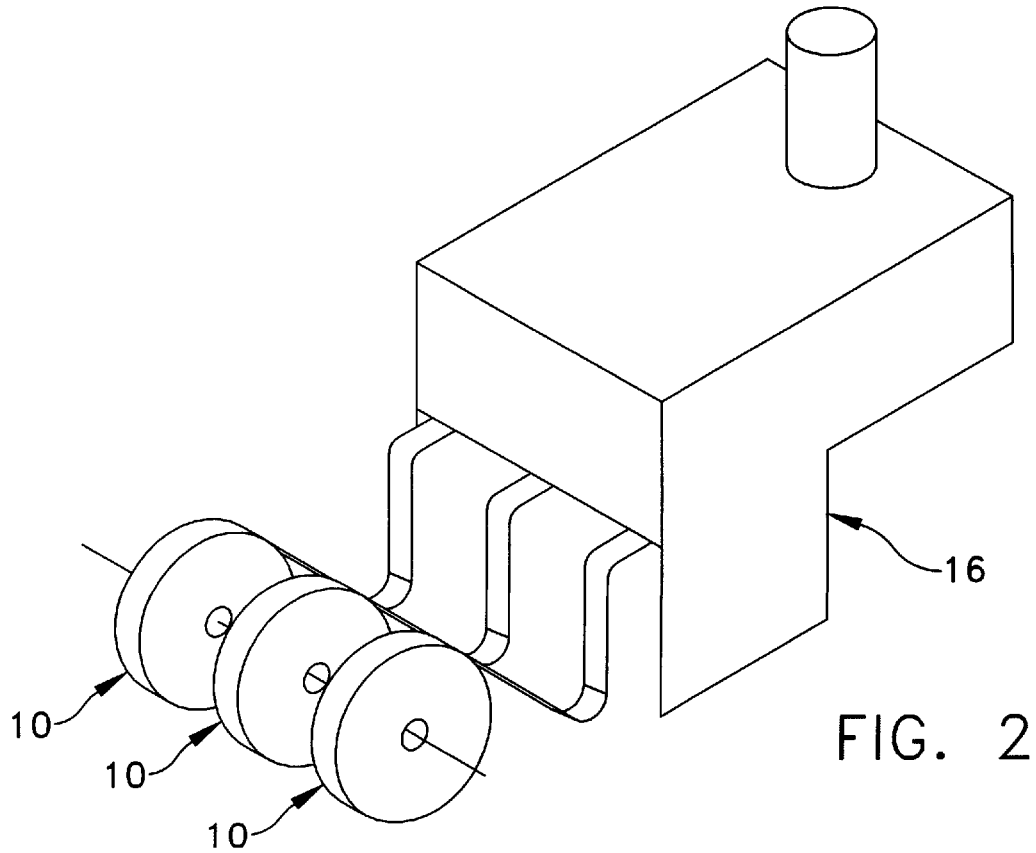
FIG. 2 is a perspective view of a first embodiment of the thermoformer machine of the present invention used in connection with a conventional sealing machine.
Figure 5:
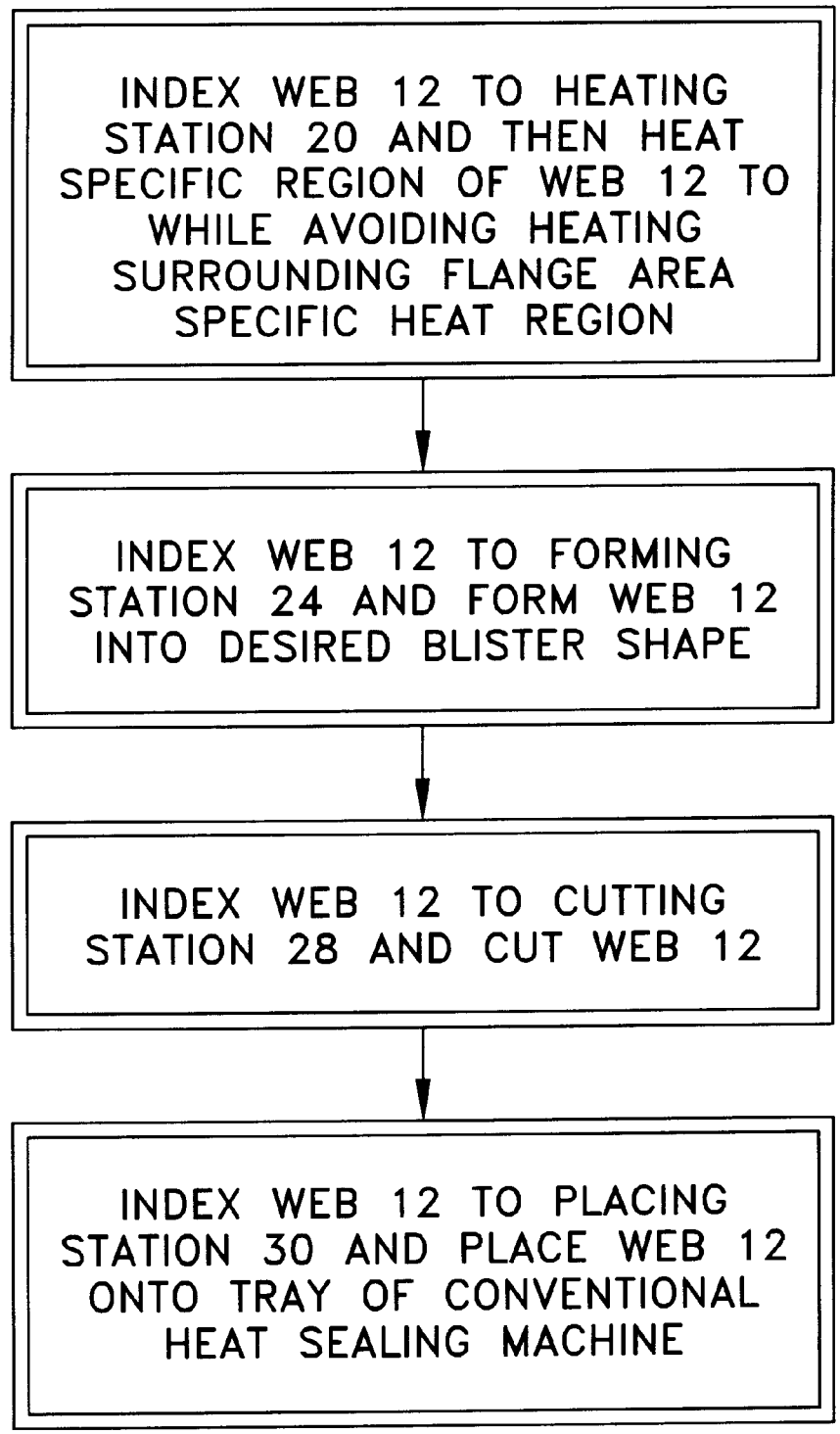
FIG. 5 is a flow chart showing the operation of the first embodiment.

Referring to FIGS. 2 and 3 wherein the thermoformer machine 16 is shown adjacent and in cooperation with a conventional heat sealer machine 17. The thermoformer machine 16 generally comprises an operator panel 18 which control the various features, indexing and operation of the machine.

The thermoformer machine 16 further comprises a heating station 20 which is generally adapted to heat each web 12. Heating station 20 may comprise a variety of conventional mechanisms for heating each web 12. In the embodiment shown, heating station 20 comprises upper and lower heater plates 22 which are brought into contact with each web 12 to heat the same.

The thermoformer machine 16 further comprises a forming station 24 which is generally adapted to form each web 12 into the desired blister shape. Forming station 24 may comprise a variety of conventional mechanisms for forming each web 12. In the embodiment shown, forming station 20 comprises upper and lower forming plates 26 which are brought into contact with each web 12 to form the same.

The thermoformer machine 16 further comprises a cutting station 28 which is generally adapted to cut each web 12 along the cut area 14. Cutting station 28 may comprise a variety of conventional mechanisms for cutting each web 12. In the embodiment shown, cutting station 28 comprises one a of variety of well known cutting means common in the industry such as guillotine or transversing shear which are brought into contact along cut area 14 to cut each web 12.

The thermoformer machine 16 further comprises a placing station 30 which is generally adapted to place each web 12 into a tray of the heat sealer machine. Placing station 30 may comprise a variety of conventional mechanisms for placing each web 12 into the tray of the heat sealer machine. In the embodiment shown, placing station 30 comprises a generally vertically moving set of suction cups or vacuum plugs.

The pre-cut roll 10 may be made from a variety of thermoplastic materials such as PVC, PET, and/or polystyrene.

The present invention offers significant advantages over conventional devices. By way of example only, consider the following:

(1) the use of the pre-cut roll 10 to be fed into a thermoformer offers significant advantages over conventional devices in that the present invention eliminates the need for a trim press in a simple former that can be connected directly to an existing heat sealer.

(2) the present invention further takes newly formed blister, cuts it from the web and places it into the sealing tray. Since the blisters are not stacked they may be designed with zero draft side wall which is not possible with existing magazine fed heat sealers.

(3) the present invention also utilizes specific heat regions, by contact heat, proximity heat or aperture directed forced hot air to allow the blisters to be formed without orientating (or heat deforming) the flange area of the blister. This eliminates the problem of "cold formed" blisters wherein the flange deforms under heat and pulls away from the seal area producing a defective seal. Forming parts with this method produces zero trim scrap during the forming and cut process. The use of multiple rolls allows for the direct match up with seal tray cavities.

Referring to FIGS. 6 and 7 wherein a second embodiment of the present invention shows a thermoformer 48. In the second embodiment, the thermoformer 48 comprises three (3) thermoformer modules 52 aligned in parallel. Each thermoformer module 52 has a forming station, 20, a heating station 24, and a cutting station 28. A pre-cut or prefabricated roll 10 is provided and fed into each thermoformer module 52. Indexing of each pre-cut roll 10 is controlled by a single roller 50 so that each of the pre-cut rolls are indexed or moved through its corresponding thermoformer module 52 at the same time. The roller 50 may be controlled by a variety of means such as a clutch brake (not shown) or controller module (not shown). Although modular thermoformer 48 is shown with three (3) thermoformer modules 52, there may be more or less than three. In the preferred embodiment, the number of thermoformer modules 52 is dependent upon the number of heat sealers employed (i.e., one thermoformer module 52 for each heat sealer).

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed:

1. A thermoformer machine comprising a first thermoformer module, said first thermoformer module comprising a pre-cut roll comprising first and second webs connected by a cut area, each of said first and second webs further comprising a blister portion and a flange portion, said first thermoformer module further comprising a heating station adapted to apply heat so as to allow said blister portion to be formed without heat deforming said flange area, said first thermoformer module further comprising a forming station adapted to form said first and second web; said first thermoformer module further comprising a cutting station adapted to cut said cut area thereby separating said first web from said second web.

* * * * *

UNITED STATES PATENT AND TRADEMARK OFFICE
CERTIFICATE OF CORRECTION

PATENT NO   :  6,129,538
DATED       :  October 10, 2000
INVENTOR(S) :  W. Charles Jones It is certified that error appears in the above-identified patent and that said Letters Patent is hereby corrected as shown below:

On the front page, under Inventor:
Please insert  --Assignee:  Emerging Technologies Trust--

Signed and Sealed this

Fifteenth Day of May, 2001

Attest:

NICHOLAS P. GODICI

Attesting Officer

Acting Director of the United States Patent and Trademark Office